US008620748B1

(12) United States Patent
Ruarte et al.

(10) Patent No.: US 8,620,748 B1
(45) Date of Patent: Dec. 31, 2013

(54) MULTI-DIMENSIONAL METHOD FOR OPTIMIZED DELIVERY OF TARGETED ON-LINE BRAND ADVERTISEMENTS

(75) Inventors: Fernando Ruarte, San Francisco, CA (US); Raj Narayan, Redwood City, CA (US); Ryan Roslansky, San Francisco, CA (US); Kiumarse Zamanian, Hillsborough, CA (US); Adam Souzis, San Francisco, CA (US); Emmanuel Job, San Francisco, CA (US); Bryan Beresford, Redwood City, CA (US); Hsinhong (Simon) Yeh, San Francisco, CA (US); Anne Farmer, San Francisco, CA (US); Bao-Long Nguyen-Trong, Alameda, CA (US); Wendy Mazzoni, San Francisco, CA (US); Dianna Gewing-Mullins, Dublin, CA (US); Jamie A. Maddaloni, San Francisco, CA (US); Michael Tancinco, San Francisco, CA (US); Rosanna Mairena, Hayward, CA (US); Samir Arora, Woodside, CA (US)

(73) Assignee: GLAM.Media, Inc., Brisbane, CA (US)

( * ) Notice: Subject to any disclaimer, the term of this patent is extended or adjusted under 35 U.S.C. 154(b) by 842 days.

(21) Appl. No.: 12/623,858

(22) Filed: Nov. 23, 2009

Related U.S. Application Data

(60) Continuation-in-part of application No. 12/340,112, filed on Dec. 19, 2008, which is a division of application No. 11/515,618, filed on Sep. 5, 2006, now abandoned.

(60) Provisional application No. 61/117,293, filed on Nov. 24, 2008, provisional application No. 60/714,325, filed on Sep. 6, 2005, provisional application No. 60/715,075, filed on Sep. 8, 2005.

(51) Int. Cl.
 *G06Q 30/00* (2012.01)
(52) U.S. Cl.
 USPC .................. 705/14.49; 705/14.41; 705/14.42; 705/14.43
(58) Field of Classification Search
 USPC ............... 705/14, 14.41, 14.49, 14.42, 14.43
 See application file for complete search history.

(56) References Cited

U.S. PATENT DOCUMENTS

| | | | | |
|---|---|---|---|---|
| 6,052,670 | A | 4/2000 | Johnson | 705/27 |
| 6,721,748 | B1 | 4/2004 | Knight et al. | 707/10 |
| 6,873,965 | B2 | 3/2005 | Feldman et al. | 705/10 |
| 2001/0032133 | A1 | 10/2001 | Moran | 705/14 |
| 2002/0112035 | A1 | 8/2002 | Carey et al. | 709/219 |
| 2002/0147570 | A1* | 10/2002 | Kraft et al. | 702/186 |
| 2005/0187818 | A1* | 8/2005 | Zito et al. | 705/14 |
| 2007/0027758 | A1* | 2/2007 | Collins et al. | 705/14 |

OTHER PUBLICATIONS

U.S. Appl. No. 60/703,904, filed Jul. 2005, Collins et al.*

* cited by examiner

*Primary Examiner* — Michael Bekerman
*Assistant Examiner* — Mario Iosif
(74) *Attorney, Agent, or Firm* — Dergosits & Noah LLP

(57) ABSTRACT

A method of delivering targeted on-line advertising to an end user of a computer network system comprises creating an advertisement campaign having a plurality of dimensions associated therewith, obtaining end user data based upon engagement of the end user with the network system, profiling advertisement content available on the network system to identify specific items of advertisement content that are compatible with the advertising campaign, for each item of compatible advertisement content, utilizing the end user data and metrics associated with the plurality of dimensions associated with the advertisement campaign to develop an effectiveness measurement, and utilizing the effectiveness measurements to select at least one item of compatible advertisement content for display to the end user.

6 Claims, 8 Drawing Sheets

| CAMPAIGN DELIVERY | | | | | | |
|---|---|---|---|---|---|---|
| IMPRESSIONS: 967,666 | VISITORS: 246,667 | | CLICKS: 3667 | | CTR: .03% | |

| CHANNEL DELIVERY | | | |
|---|---|---|---|
| CHANNEL | IMPRESSIONS | CLICKS | CTR |
| BEAUTY | 805,799 | 302 | .03% |
| ENTERTAINMENT | 99,374 | 24 | .7% |
| CELEBRITIES | 85,124 | 3567 | .2% |
| FASHION | 350,993 | 245 | .75% |
| LIVING | 8,761 | 3557 | 4.4% |
| HEALTH | 723,883 | 345 | 8.3% |
| WELLNESS | 6,334 | 123 | .54% |
| FAMILY | 12,234 | 164 | .02% |
| VIEW ALL | | | |

| BEHAVIORAL DELIVERY | | | |
|---|---|---|---|
| SOURCE | IMPRESSIONS | CLICKS | CTR |
| BEAUTY COSMETICS | 805,799 | 302 | .03% |
| LIVING TRAVEL | 99,374 | 24 | .7% |
| FASHION SHOES | 65,124 | 3567 | .2% |
| FASHION HANDBAGS | 350,993 | 245 | .75% |
| VIEW ALL | | | |

| PLACEMENT | | | |
|---|---|---|---|
| PLACEMENT | IMPRESSIONS | CLICKS | CTR |
| ABOVE THE FOLD | 805,799 | 302 | .03% |
| BELOW THE FOLD | 99,374 | 24 | .7% |
| N/A | 85,124 | 3567 | .2% |

ABOVE THE FOLD: 25%
BELOW THE FOLD: 55%
N/A: 20%

| GEOGRAPHY | | | |
|---|---|---|---|
| STATE | IMPRESSIONS | CLICKS | CTR |
| NEW YORK | 805,799 | 302 | .03% |
| CALIFORNIA | 99,374 | 24 | .7% |
| ARIZONA | 85,124 | 3567 | .2% |
| ILLINOIS | 350,993 | 245 | .75% |
| CONNECTICUT | 805,799 | 302 | .03% |
| OREGON | 99,374 | 24 | .7% |
| FLORIDA | 85,124 | 3567 | .2% |
| WASHINGTON | 350,993 | 245 | .75% |
| VIEW ALL | | | |

FIG. 6

MULTI-DIMENSIONAL METHOD FOR OPTIMIZED DELIVERY OF TARGETED ON-LINE BRAND ADVERTISEMENTS

RELATED APPLICATIONS

This application claims the benefit of U.S. Provisional Application No. 61/117,293, filed on Nov. 24, 2008, and titled "Multi-Dimensional Framework for Optimized Delivery of Targeted On-Line Brand Advertisements." U.S. Provisional Application No. 61/117,293 is hereby incorporated by reference herein in its entirety.

This application is a continuation-in-part of co-pending and commonly assigned U.S. application Ser. No. 12/340,112, filed on Dec. 19, 2008 and titled "Internet Publishing Engine and Publishing Process Using Ad Metadata to Deliver Ads." U.S. application Ser. No. 12/340,112 is hereby incorporated by reference herein in its entirety.

U.S. application Ser. No. 12/340,112 is a divisional of U.S. application Ser. No. 11/515,618, filed on Sep. 5, 2006, and titled "Online Personalized Content and Merchandising Environment." application Ser. No. 11/515,618 is hereby incorporated herein by reference in its entirety.

Application Ser. No. 11/515,618 claims the benefit of U.S. Provisional Application No. 60/714,325, filed on Sep. 6, 2005, by Arora et al. and titled "Online Personalized Content and Merchandising Environment." Provisional Application No. 60/714,325 is hereby incorporated by reference herein in its entirety.

Application Ser. No. 11/515,618 also claims the benefit of U.S. Provisional Application No. 60/715,075, filed on Sep. 8, 2005, by Arora et al. and titled "Online Personalized Content and Merchandising Environment." Provisional Application No. 60/715,075 is hereby incorporated by reference herein in its entirety.

TECHNICAL FIELD OF THE INVENTION

The present invention relates to the presentation of personalized content and merchandising to an end user in an online environment. More particularly, the present invention is directed to multi-dimensional systems and methods for providing superior branding effectiveness for on-line display advertisements.

BACKGROUND OF THE INVENTION

Above-cited application Ser. No. 11/515,618 discloses a database-based content management system for a network system that provides a straightforward process for publishing content and advertisements from advertisers and affiliates associated with the network system to a website. The disclosed content management system implements a workflow-based approach that allows different types of network content contributors and other sources to push and feed data to the different sections of the website properties. More specifically, it provides a centralized data repository and a set of content contributor web-based interfaces so that non-technical resources can jointly and concurrently work on the publishing of the sites. In this way, editors can log into the system and create database objects that hold the initial metadata and mapping for the stories to be published, merchandisers can manage and import collections of products and their availability information from a very large number of records, made available to the network system via automated data feeds that are updated daily, designers can prepare a custom layout for each page of a custom collection and upload the different graphical assets that will be required for building the layout, and production specialists can gather all of the assets, lay them out and publish the website.

Those skilled in the art appreciate that, before a determination can be made regarding how to increase the return-on-investment (ROI) from on-line advertising, the objectives for the on-line advertising campaign must be determined. This is necessary because on-line advertising often serves multiple purposes. For example, on-line ads can help to increase brand awareness, brand perception and user engagement with the ad (e.g., clicks), as well as ultimately lead to higher sales of the products and services being advertised.

While traditional media (e.g., magazines and TV) measure reach, awareness and product sales as the primary metrics for ad campaign effectiveness, on-line advertising has used ad impressions delivered, clicks and conversions as its primary metrics. However, recent research reports indicate that only sixty percent of on-line end users actually see the ads above the fold and there is no correlation between display ad clicks and brand metrics. Furthermore, only one percent of on-line end users click on ads and there is no connection between measured attitude towards a brand and the number of times an ad for that brand was clicked.

As more advertisers shift their ad campaigns to on-line digital media, it is clear that brand advertising is not possible with small text ads that typically appear next to search results. Also, the majority of on-line advertising has focused on performance-based campaigns with "click" as the primary measurement metric. Graphical ads have now moved beyond static banner ads to include flash animation, video and sound, thus making it more compelling to present brand ads in more attractive and engaging formats. With Web advertising expected to surpass $60 billion by 2013, and with display and video ads to account for more than a third of that amount, there is increasing demand for more effective systems and methods for delivering on-line brand advertising.

SUMMARY OF THE INVENTION

The present invention provides systems and methods for delivering on-line brand advertising that go beyond clicks and offer new metrics and capabilities to help advertisers increase the effectiveness of their on-line brand ad campaigns. These metrics combine the best of both traditional media and new digital media while allowing advertisers to assign higher weights to specific metrics that are more important for the success of their brand ad campaign. Utilizing the concepts of the present invention, advertisers are able to create, execute, analyze and optimize their brand ad campaigns more effectively and efficiently.

An embodiment of a method of delivering targeted on-line advertising to an end user of a computer network system in accordance with the concepts of the present invention comprises creating an advertisement campaign having a plurality of dimensions associated therewith, obtaining end user data based upon engagement of the end user with the network system, profiling advertisement content available on the network system to identify items of advertisement content that are compatible with the advertisement campaign, for each item of compatible advertisement content, utilizing the end user data and metrics associated with the advertisement campaign to develop an effectiveness measurement, and utilizing the effectiveness measurements to select at least one item of compatible advertisement content for display to the end user.

The features and advantages of the various aspects of the present invention will be more fully understood and appreciated upon consideration of the following detailed description of the invention and the accompanying drawings, which set forth illustrative embodiments in which the concepts of the invention are utilized.

DESCRIPTION OF THE DRAWINGS

FIG. 6 provides an example of an ad campaign analytics dashboard that can be developed in accordance with the concepts of the present invention.

DETAILED DESCRIPTION OF THE INVENTION

Figure 1:
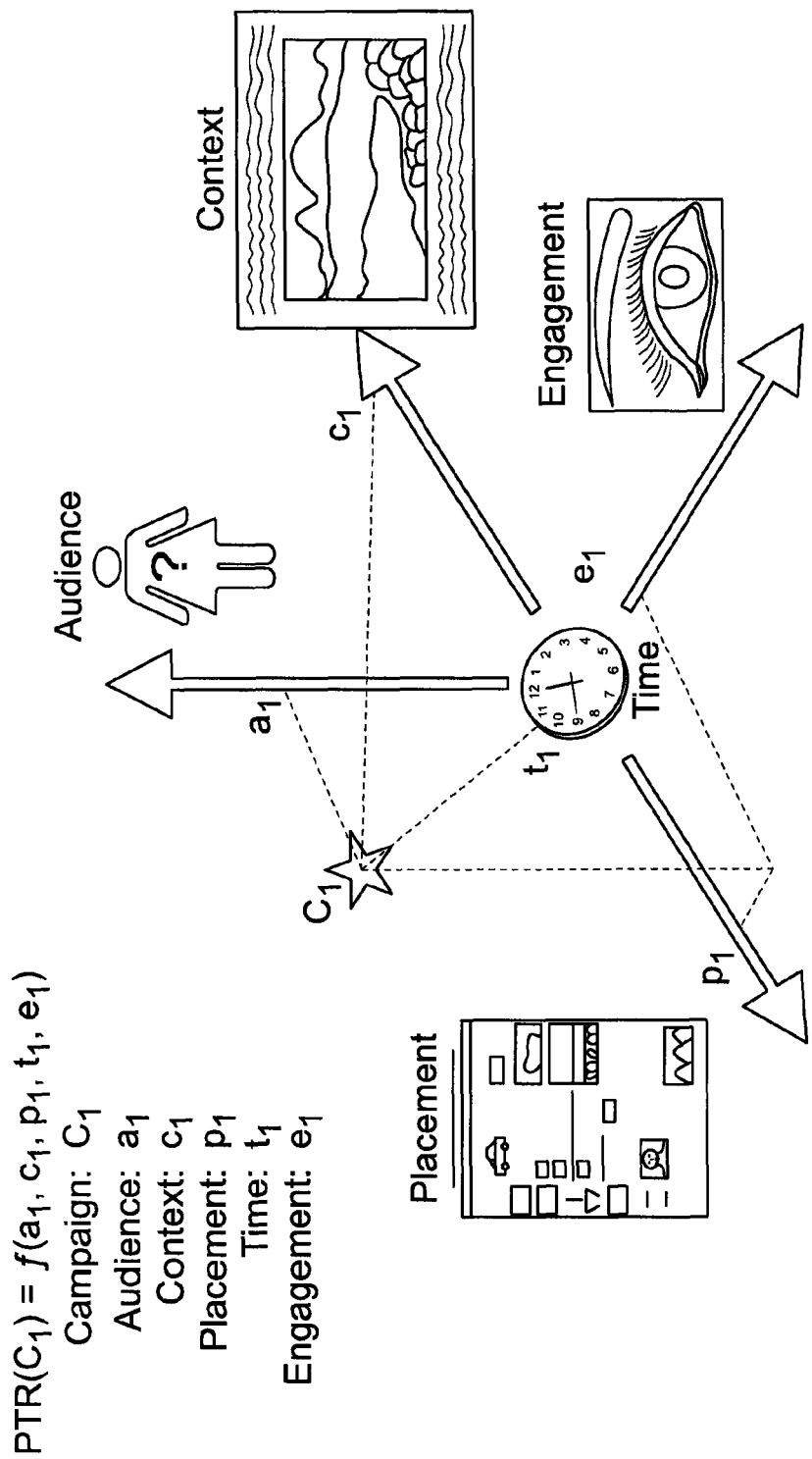
FIG. 1 is a diagram illustrating five primary dimensions of a method of delivering on-line brand advertising in accordance with the concepts of the present invention.

FIG. 1 presents a visualization of five primary dimensions associated with a brand ad campaign in accordance with the invention: audience, context, time, placement and engagement. For each of these dimensions, a brand ad campaign has specific values associated with the metrics in that dimension. For example, the "audience" dimension has metrics that measure the reach and quality of a targeted audience, while the "placement" dimension has metrics that deal with the quality, size and surrounding of a brand ad on a web page. An illustrative list of metrics for these five dimensions is as follows:

Brand Ad Dimensions

Audience
Demographic: age, affinity, income, ethnicity, marital status, education, etc.
Geographic: country, DMA/region, city and zip-code
Psychographic: personality, values, attitudes, interests, and lifestyle
Behavioral: frequently visited content, search intent, ads clicked on, etc.
Intent: content visited, search intent, segment behavior, etc.
Context
Channel: Beauty, health, sports, etc.
Type: news, email, stories, gossip, social networking, etc.
Time
Time zone: reaching active audiences across and within countries
Intraday: most impactful times: early morning email, lunch-hour surfing, etc.
Seasonal: relevant products and services in tune with seasons
Special events: benefiting from expected traffic surges for special events
Sequenced: higher impact with time-sequenced, related ad impressions
Placement
Position: above the fold, on the sides, pre-, mid- or post-roll for video, etc.
Size: size of the ad based on IAB standards, such as 300×250
Brand proximity: Effective combinations of banner ads on the same page
Engagement
Interactions: clicks, mouse-overs, video play/rewind/pause/etc.
Conversions: on-line and off-line transactions tied to the ad
Feedback: survey results, ranking, etc.
Viral: sharing, forwarding, etc.

For a given brand ad campaign, an "effectiveness" measure is in turn computed based on a combination of the weighted values of the metrics associated with that campaign. Advertisers have control over the weights assigned to each metric in order to emphasize specific objectives of a brand ad campaign. This measure is referred to herein as Prime Target Rank (PTR) and can be used to compare brand ad campaigns with similar objectives. For example, two rich media movie ads targeted for similar audiences and placed in similar web pages can be compared based upon their respective PTRs. Furthermore, a PTR index can be established for a category of brand ads, e.g., "organic food," to facilitate evaluating the effectiveness of brand ads in that particular category.

PTR is computed as follows:
Prime Target Rank of an on-line brand ad campaign is a positive real number defined as:

$$PTR = w_1*A + w_2*C + w_3*T + w_4*P + w_5*E (w_1+w_2+w_3+w_4=1.0)$$

A=Audience (positive real number)
C=Context (positive real number)
T=Time (positive real number)
P=Placement (positive real number)
E=Engagement (positive real number)
The value for each of the above parameters is computed based upon the following:
Audience to whom the brand ad campaign is delivered is defined as:

$$A = w_1*AR + w_2*AS + w_3*AV (w_1+w_2+w_3=1.0)$$

AR=Audience Reached (impressions_delivered/forecasted_inventory) (between 0&1)
AS=Audience Scarcity 1−(targeted_audience/total_audience) (between 0&1)
AV=Audience Value (average CPM for campaigns targeting similar audience)
Context of the page within a web site in which the brand ad is displayed is defined as:

$$C = w_1*EQ + w_2*UV + w_3*PV + w_4*TV + w_5*RI + w_6*PR (w_1+w_2+w_3+w_4+w_5+w_6=1.0)$$

EQ=Editorial Quality (computed based on metrics defined in Appendix C)
UV=Unique Visitors (per month) (integer)
PV=Page Views (per month) (integer)
TV=Avg. Time spent per Visit (in seconds)
RI=Revenue per ad Impression (in cents)
PR=Page Rank (based on Google) (1: lowest 10: highest defined per Google PR algorithm)
Time at which the brand ad campaign is delivered is defined as:

$$CE = w_1*IV + w_2*TPI + w_3*CTR + w_4*SR (w_1+w_2+w_3+w_4=1.0)$$

IV=Impressions Viewed (impressions_abovethefbld/total_impressions_rendered)

Placement of a creative for a brand ad campaign is defined as:

$$P = w_1 * CS + w_2 * CP + w_3 * CQ + w_4 * CT (w_1 + w_2 + w_3 + w_4 = 1.0)$$

CS=Creative Size (total area of the ad creative in pixels)
CL=Creative Location (4: northwest, 3: north or northeast, 2: east or west, 1: south)
CQ=Creative Quality (1: simple & low-quality 10: elegant & high-quality)
CT=Creative Technology (1: text 2: image 3: rich-media 4: video)

Engagement with the brand ad campaign is defined as:

$$CE = w1 * IV + w2 * TPI + w3 * CTR + w4 * SR (w1 + w2 + w3 + w4 = 1.0)$$

IV=Impressions Viewed (impressions_abovethefold/total_impressions_rendered)
TPI=Avg. Time Per Impression (total_user_ad_view_time/total_impressions)
CTR=Click Through Rate (total_clicks/total_impressions_rendered)
SR=Success Rate (total_desired_user_activities/total_impressions_rendered)

The targeting component deals with finding the most appropriate end user and environment that meet an ad campaign's specific targeting profile. Targeting is based upon the metrics associated with the five dimensions, as described above. For audience targeting, a behavioral interest taxonomy facilitates profiling end users based on their various activities across the network system. An illustrative taxonomy is as follows:

Behavioral Interest Taxonomy

Beauty (B)
Beauty.Cosmetics (BC)
Beauty.Cosmetics.BodySkinCare (BCB)
Beauty.Cosmetics.FaceCareMakeup (BCF)
Beauty.Cosmetics.Perfume (BCP)
Beauty.HairCareStylesColoring (BH)
Entertainment (E)
Entertainment.CelebrityNewsGossip (EC)
Entertainment.Films (EF)
Entertainment.Gaming (EG)
Entertainment.Music (EM)
Entertainment.RestaurantsBars (ER)
Entertainment.ShowsTheatres (ES)
Entertainment.TV (ET)
Fashion (F)
Fashion.Apparel (FA)
Fashion.Cosmetics (FC)
Fashion.Hair (FH)
Fashion.Jewelry (FJ)
Fashion.PursesBags (FP)
Fashion.Shoes (FS)
Health (H)
Health.AllergiesAsthma (HA)
Health.BabyInfantHealth (HB)
Health.CaridoHealth (HC)
Health.DentalHealth (HD)
Health.Diabetes (HI)
Health.HeadacheMigraine (HH)
Health.MentalHealth (HM)
Health.Oncology (HO)
Health.SexualHealth (HS)
Health.SexualHealth.BirthControl (HSB)
Health.VisionHealth (HV)
Living (L)
Living.Autos (LA)
Living.Crafts (LC)
Living.EcoGreen (LE)
Living.Food (LF)
Living.Food.Cooking (LFC)
Living.Food.OrganicHealthyFood (LFO)
Living.Food.WineBeerCocktail (LFW)
Living.GamesHobbies (LG)
Living.Home (LH)
Living.Home.Decorating (LHD)
Living.Home.Entertaining (LHE)
Living.Home.Furniture (LHF)
Living.Home.InteriorDesign (LHI)
Living.Home.Pets (LHP)
Living.Home.Remodeling (LHR)
Living.Home.TechAppliances (LHT)
Living.MoneyFinance (LM)
Living.News (LN)
Living.ParentingMoms (LP)
Living.ParentingMoms.ChildCare (LPC)
Living.ParentingMoms.Pregnancy (LPP)
Living.RomanticRelationships (LR)
Living.Sports (LS)
Living.Sports.Golf (LSG)
Living.Sports.Ski (LSS)
Living.Sports.Tennis (LST)
Living.Travel (LT)
Living.Travel.Airlines (LTA)
Living.Travel.BeachesIslandsCruises (LTB)
Living.Travel.DoemsticDestinations (LTD)
Living.Travel.HotelsLodging (LTH)
Living.Travel.InternationalDestinations (LTI)
Living.TraveLSpasMassages (LTS)
Living.Weddings (LW)
Shopping (S)
Shopping.Apparel (SA)
Shopping.BeautyFragrance (SB)
Shopping.Electronics (SE)
Shopping.HomeGarden (SH)
Shopping.JewelryWatches (SJ)
Shopping.KidsBabyNeeds (SK)
Shopping.Luxury (SL)
Shopping.ShoesAccessories (SS)
SocialMedia (M)
SocialMedia.Network (MN)
SocialMedia.Community (MC)
Wellness (W)
Wellness.Aging (WA)
Wellness.DietNutrition (WD)
Wellness.EcoGreen (WE)
Wellness.FitnessExercise (WF)
Wellness.HolisticHealth (WH)
Wellness.OrganicFood (WO)
Wellness.Relaxation (WR)
Wellness.Spa (S)
Wellness.Spirituality (WP)
Wellness.StressManagement (WM)
Wellness.Yoga (WY)

Furthermore, various audience segments are defined as aggregations of multiple behavioral interests that collectively identify end users with similar interests, such as "gadget lover." Each brand ad campaign in turn may have multiple targeting parameters associated with it and the ad server of the network system ensures that the brand ad is delivered in the right context, to the appropriate audience, at the correct time, with the desired engagement.

The serving component is responsible for handling the requests from the web server to return the most appropriate brand ad for a given web page, ad position and size, end user, and time, for example. The ad server makes its decision based upon several criteria including, for example, the targeting characteristics of the ad campaign, its priority compared to other running ad campaigns, and pacing requirements based on daily impressions that need to be delivered to meet the campaign goal. Therefore, the ad server utilizes a multi-dimensional arbitration and optimization scheme to select a brand ad that meets the delivery requirements of the ad campaign.

In accordance with one of its aspects, the present invention provides a network system platform that is focused on providing on-line brand advertising in accordance with the concepts discussed above. The main components of an embodiment of an ad platform that provides the on-line brand advertising are graphically depicted in the FIG. 2 block diagram and described in greater detail below in conjunction with the flow charts provided in FIGS. 3, 4 and 5.

An embodiment of a multi-dimensional ad delivery method in accordance with the concepts of the present invention comprises the following steps: 1) the creation of an advertising campaign; 2) the profiling of the content; 3) the measurement of the matching brand ad dimensions; and 4) the selection of the ad for presentation to the end user.

The Creation of the Advertising Campaign

Figure 2:
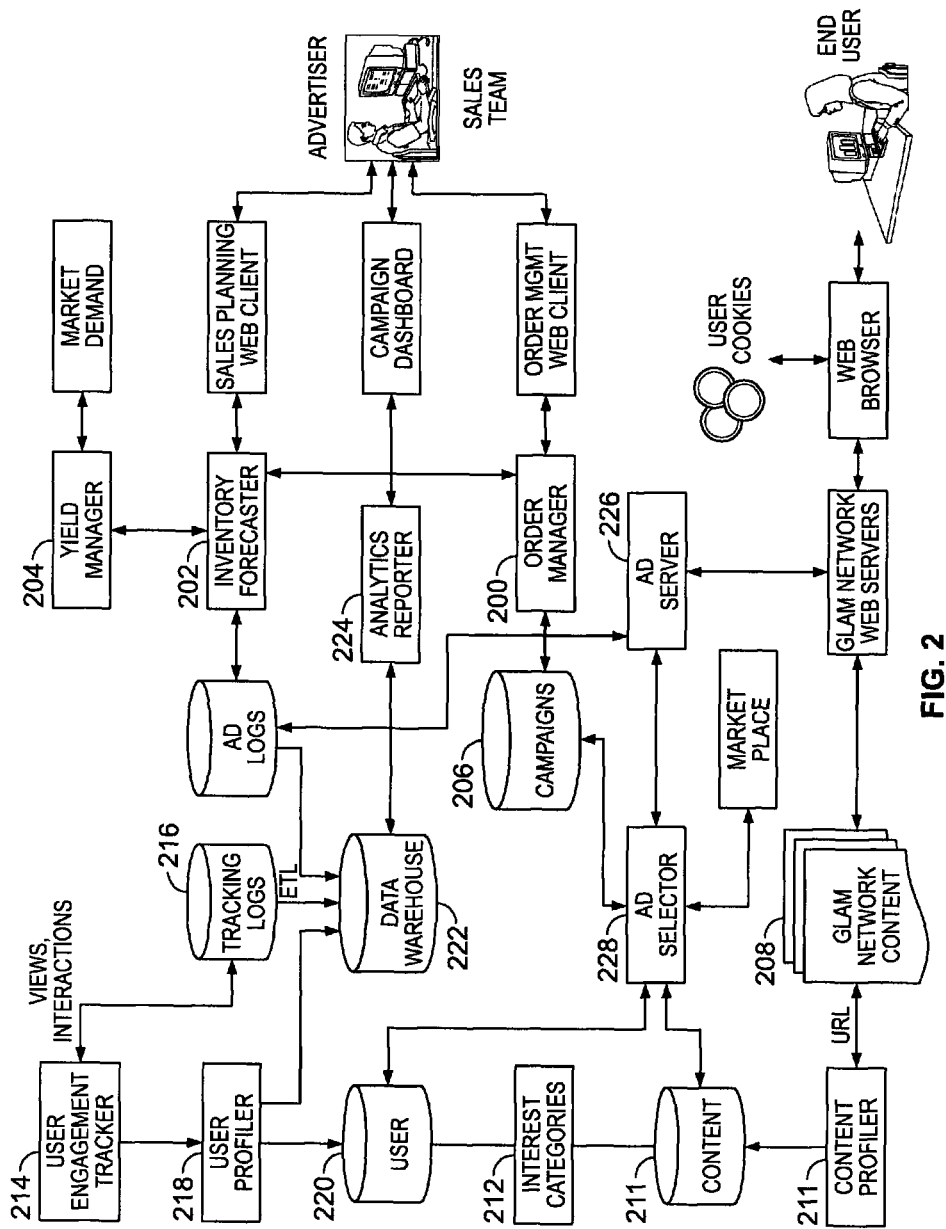
FIG. 2 is a block diagram illustrating an embodiment of a network platform for delivering on-line brand advertising in accordance with the concepts of the present invention.
Figure 3:
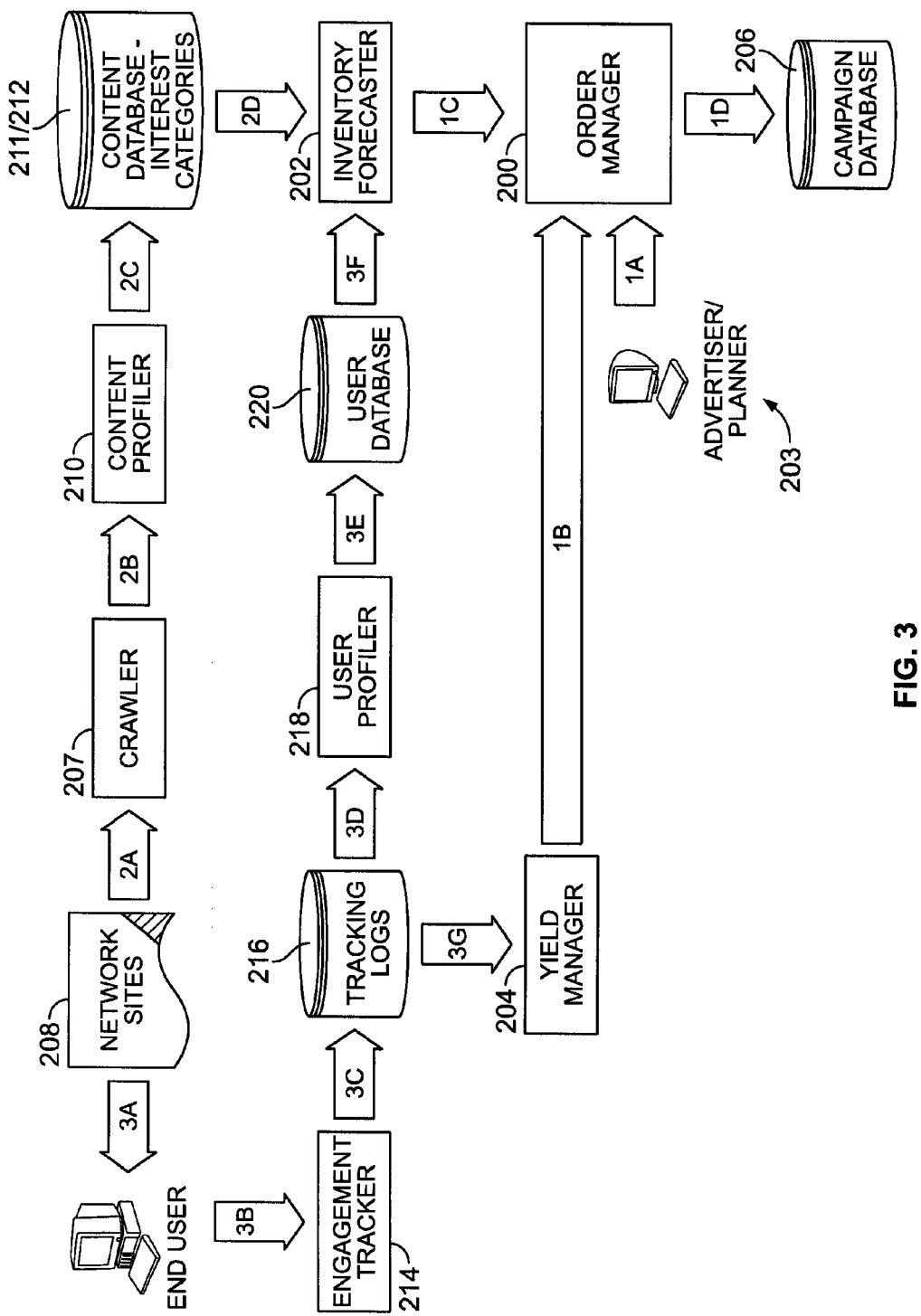
FIGS. 3 and 4 combine to provide a flow chart setting forth a sequence of steps for implementing a method of delivering on-line brand advertising in accordance with the concepts of the present invention.

With reference to the FIG. 2 block diagram and the FIG. 3 flow chart, an Order Manager Module 200, along with information provided by an Inventory Forecaster 202, allows an Advertiser Planner or Sales Team 203 to create an advertising campaign within a network system that fulfills the needs of the Advertiser/Sales Team 203 (steps 1*a* and 1*c*). These needs are expressed as a series of targeting criteria, all of which map, for example, to the five primary brand advertisement dimensions discussed in detail above: audience, context, time, placement and engagement. As an example, an advertisement can be targeted to a specific audience (e.g., women, 30 to 45 years old, with a household income greater than $70K/year), while they are in the context of researching for advice on how to educate their children, during the times of the day when they are likely to be more receptive because they are online connected from home, only for above-the-fold ad placement and set to only reach visitors who have a history of engaging with asthma condition content or have clicked on allergy medicine ads. A Yield Manager 204 allows the system to calculate a desired PTR and price and ad accordingly (step 1*b*). The Order Manager 200 then saves the information about the ad in a Campaign Database 206 (step 1*d*).

Profiling the Content

With continuing reference to FIGS. 2 and 3, a series of automated web spiders or Crawlers 207 indexes and categorizes every single page url of available Network Content 208 available in the network system (step 2*a*) and feeds that data to a Content Profiler 210 (step 2*b*). From this information, the Content Profiler 210 creates a Content Database 211 that lists every single url that it identifies as a potential target for the ad campaigns that are live (step 2*c*). The Content Database 211 is then partitioned into Interest Categories 212 to expose the different types of content or subjects with which the end user is likely to interact and made available to the Inventory Forecaster 202 (step 2*d*). It is important to note that only the content that matches the targeting objectives of the ads that are live in the network system will be created in the Content Database 211. As discussed in greater detail below, this allows the network system to manage a reduced data set during the real time selection of the ad, resulting in an architecture that can scale better and easier and faster than other comparable systems. As a result of this architecture, a network system with only twenty or forty servers that match certain key configurations can process the same counts of requests/second as an equivalent network system that requires hundreds of servers. It is estimated that the server to requests per second ratio for the system architecture disclosed herein is the highest in the industry and is at least ten times higher than that provided by currently known system architectures.

Measurement of the Matching Brand Ad Dimensions

With continuing reference to FIGS. 2 and 3, data regarding every single interaction that the end user had with any Ads or Content from the Network Content 208 (steps 3*a* and 3*b*) is saved by a User Engagement Tracker 214 in Tracking Logs 216 (step 3*c*). That data is then processed by a User Profiler 218 (step 3*d*) to select a series of matching ads that the end user is likely to be matched against and this information is stored in a User Database 220 (step 3*e*), which information is also made available to the Inventory Forecaster 202 (step 3*f*). In parallel, certain patterns are recorded and organized into a Data Warehouse 222 that will allow an Analytics Reporter 224 to expose insightful trends to the Advertiser or to the Client. Other real time brand ad dimensions are tracked and identified by an Ad Server 226 using mechanisms such as, for example, session information stored on a local computer using cookies, time on the client computer itself and x-y coordinates of the ad on the page. The information saved in the Tracking Logs 216 is made available to the Yield Manager 204 (step 3*g*).

Selection of the Ad

Figure 4:
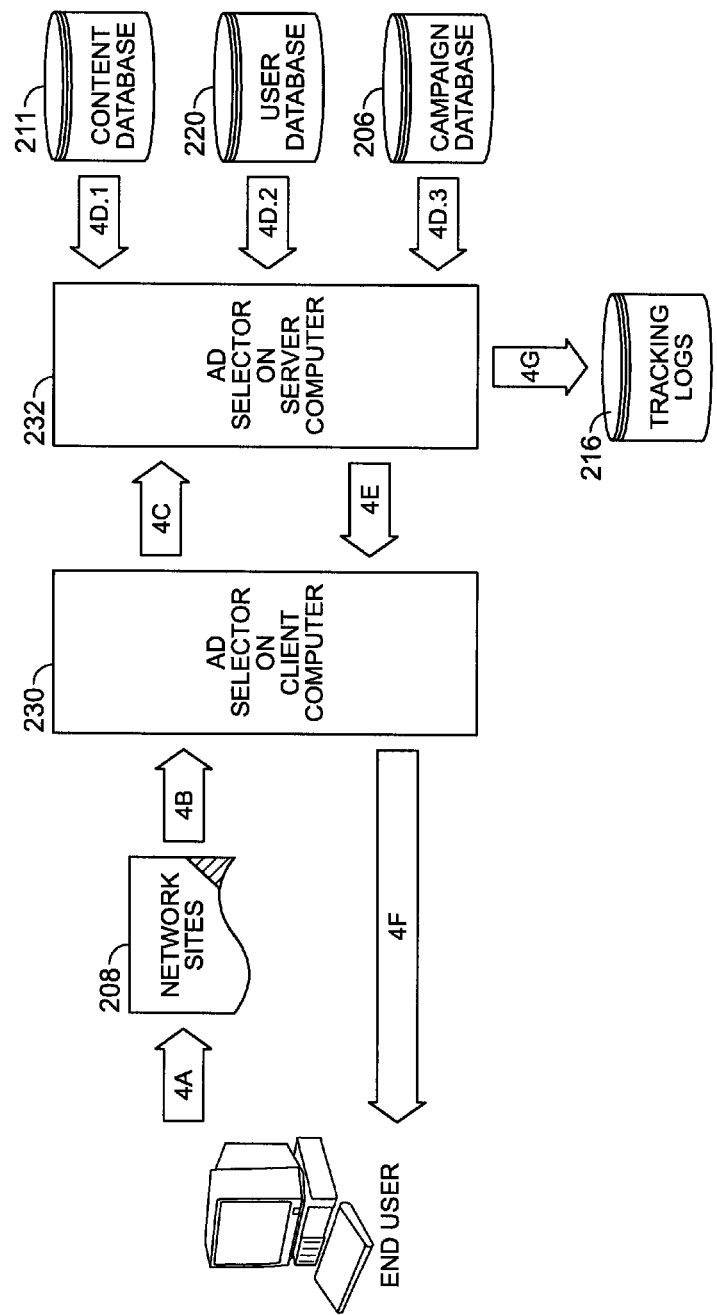

With reference to FIGS. 2 and 4, the last step in the process is performed by an Ad Selector 228, a module of the network system that runs processing both on an ad selector on the Client Computer 230 and the Ad Server Computer 232, as discussed in greater detail below. The Ad Selector 228 on the Ad Server Computer 232 is fed information from the end user's computer (steps 4*a*, 4*b*) and from the Content Database 211 (step 4*d*.1), the User Database 220 (step 4*d*.2) and the Campaign Database 206 (step 4*d*.3) in order to select the ad that will be presented to the end user. At this point, a PTR is calculated for each ad in the list of matching ads and the system selects the ad that is best suited based upon the Yield required by the Advertisers. As discussed below, using client-side technologies such as Java and Javascript, the Ad Selector 228 performs a portion (e.g., 50%0 of the processing required to select an ad on the Client Computer 230; the remaining portion (e.g., 50%) is performed on the Server Computer 232. As mentioned above, this distributed hardware architecture hugely reduces the number of servers required to scale the system.

Ad Selector—Client Server Workflow

As stated above, the Ad Selector 228 (FIG. 2) utilizes an innovative distributed processing model that splits the ad selection workload between a Client Computer 230 and a network Server Computer 232. This model allows for the ad selection to occur as a four step process where the use of both the Client Computer 230 and the Server Computer 232 are maximized.

Figure 5:
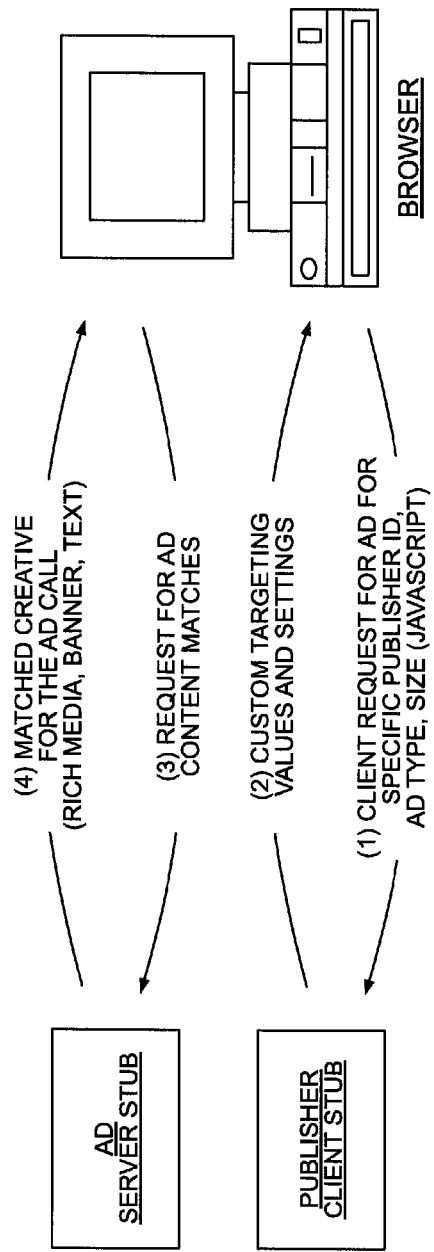
FIG. 5 illustrates the flow between a client ad selector and a network ad selector in the process flow of FIGS. 3 and 4.

With reference to FIG. 5, the distributed processing is implemented as follows:

(1) Client Request for Ad

A Javascript enabled computer makes a first call to the Ad Server 226, using the <script src=. . . > language construct for remote script retrieval, to obtain the first set of ad selection directives (Publisher Client in FIG. 5). The Javascript call sends key parameters, such as the required ad size and the affiliate/publisher id that identifies the network site on which the ad is being displayed.

(2) Custom Targeting Values and Settings

Upon the initial call, the ad server returns a series of Javascript language directives that are dynamically generated based upon the meta data contained in the Content Database 211. The Javascript directives include elements that will determine important ad selection criteria such as: whether or not the site supports and desires different types of ad creatives (e.g., banners, expandable ads, rich media, brand research ads, video ads); whether or not the site supports and desires different types of monitezation models for their ads (e.g., CPM—Cost per mile, CPC—Cost per click, CPA—Cost per customer acquisition); url specific keyword characteristics that were stored in the Content Database 211 and identified for that particular url (e.g., fashion specific content, historical high performance CPC ads on that page for Luxe Automotive advertisers). Then, the dynamically generated Javascript executes itself on the Client Computer 230 and collects more information about the environment on which it is running, such as for example, screen resolution of the computer, operating system and browser type and location of the ad (x,y coordinates, above the fold/below the fold). After the environment has been identified, the Javascript runs a first pass at the ad selection criteria (Ad Selector—Client side) and concludes which ad server within the ad server network is best suited to deliver the highest relevant ad of the desired type. After the ad server type has been identified, the Client Computer 230 makes a request to that Ad Server 226 (Ad Server stub—using the <script src= . . . > language construct for remote script retrieval) in order to execute a request for ad content matches.

(3) Request for Ad Content Matches

At this point in the process, the request to the Ad Server for ad content matches sends a series of specific key values (name=value pairs that describe a series of simple positive matching criteria) that will be used to find a specific ad. Upon receipt, the Ad Server selects the highest priority available ad that matches some or all of the targeted key values and returns the matched creative for the ad call.

(4) Matched Creative for the Ad Call

Since the second call to the Ad Server is a remote Javascript retrieval, the Client Computer 230 executes the instructions so that it can render the banner, text or rich media ad that was selected.

In the above-described model, unlike conventional models for server side ad selection that consider the client computer to be a dumb terminal that can only display content, the local processing abilities of the client computer are used to execute an algorithm that does the pre-selection of the ads. This initial step (Publisher Client Stub) reduces the universe of applicable ads from, for example, about 100,000 to a mere 1,000. By the time that the second call is made to Ad Server (Ad Server Stub), the processing time required to load the available ads and select 1 out of 1,000 takes less than 10 ms. Based upon the speed of the internet connection and the CPU type from the client computer, the time to run the two ad calls performed to select the ad can be an average of about 250 ms total. A server farm comprised of twenty ad servers (e.g., dual core Pentium 2.8 GHZ, 8 GB RAM, running Linux Centos 5.2) using the above-described technology, can serve over 50,000 concurrent ad requests. Using a conventional "server side only" model, it would take at least two hundred ad servers to ensure a response time of 250 ms on a similar 50,000 concurrent ad requests load.

Various data about the delivery and user engagement for an ad campaign are recorded in log files and subsequently processed and analyzed to provide insight about the performance of the ad campaign. The same metrics of the above-discussed five dimensions of the ad platform are used as the basis of collecting and analyzing this data, thus providing a consistent framework for targeting and analytics. The reports are in turn presented to the analysts in a Web-based dashboard, an example of which is shown in FIG. 6.

Figure 7:
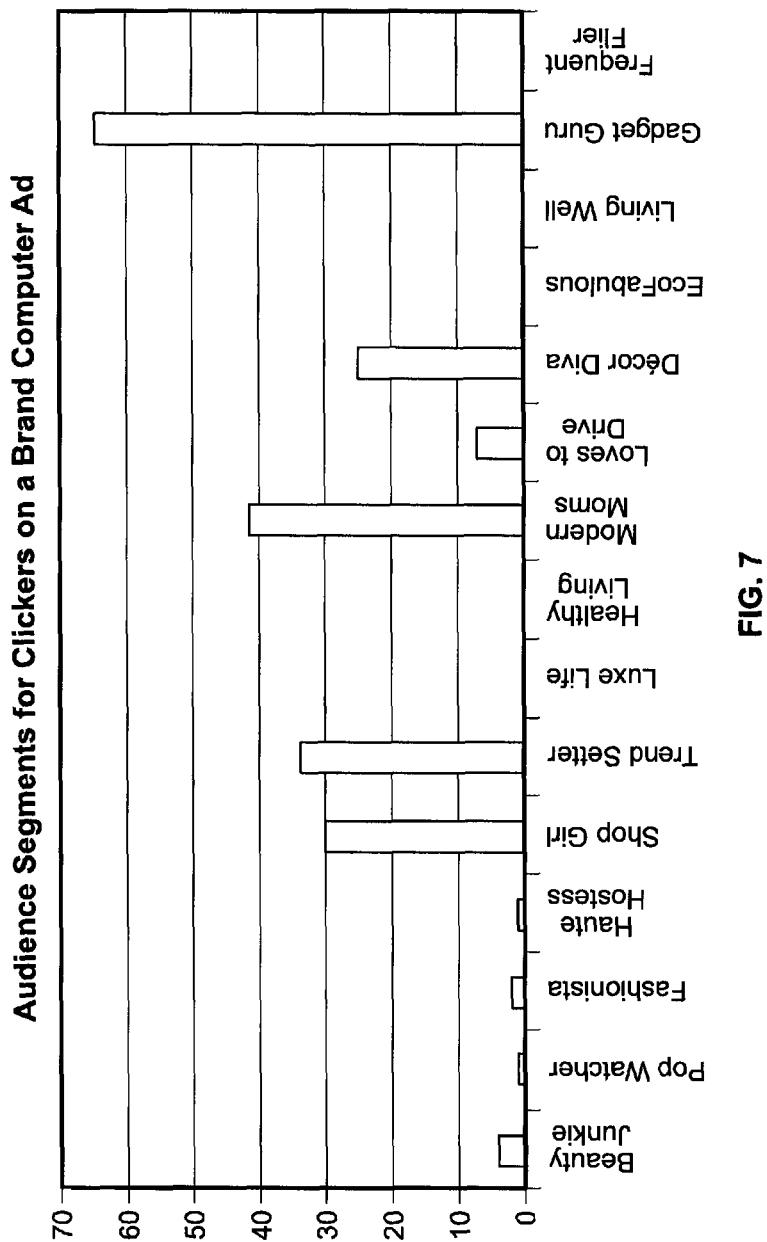
FIG. 7 is an example of audience segmentation for users who clicked on an on-line brand ad for a home computer provided in accordance with the concepts of the present invention.

Furthermore, brand ad campaigns can be further analyzed based upon a specific dimension, such as audience segmentation of the user engagements. An example of audience segmentation for the users who clicked on a brand ad for a home computer is shown in FIG. 7.

Figure 8:
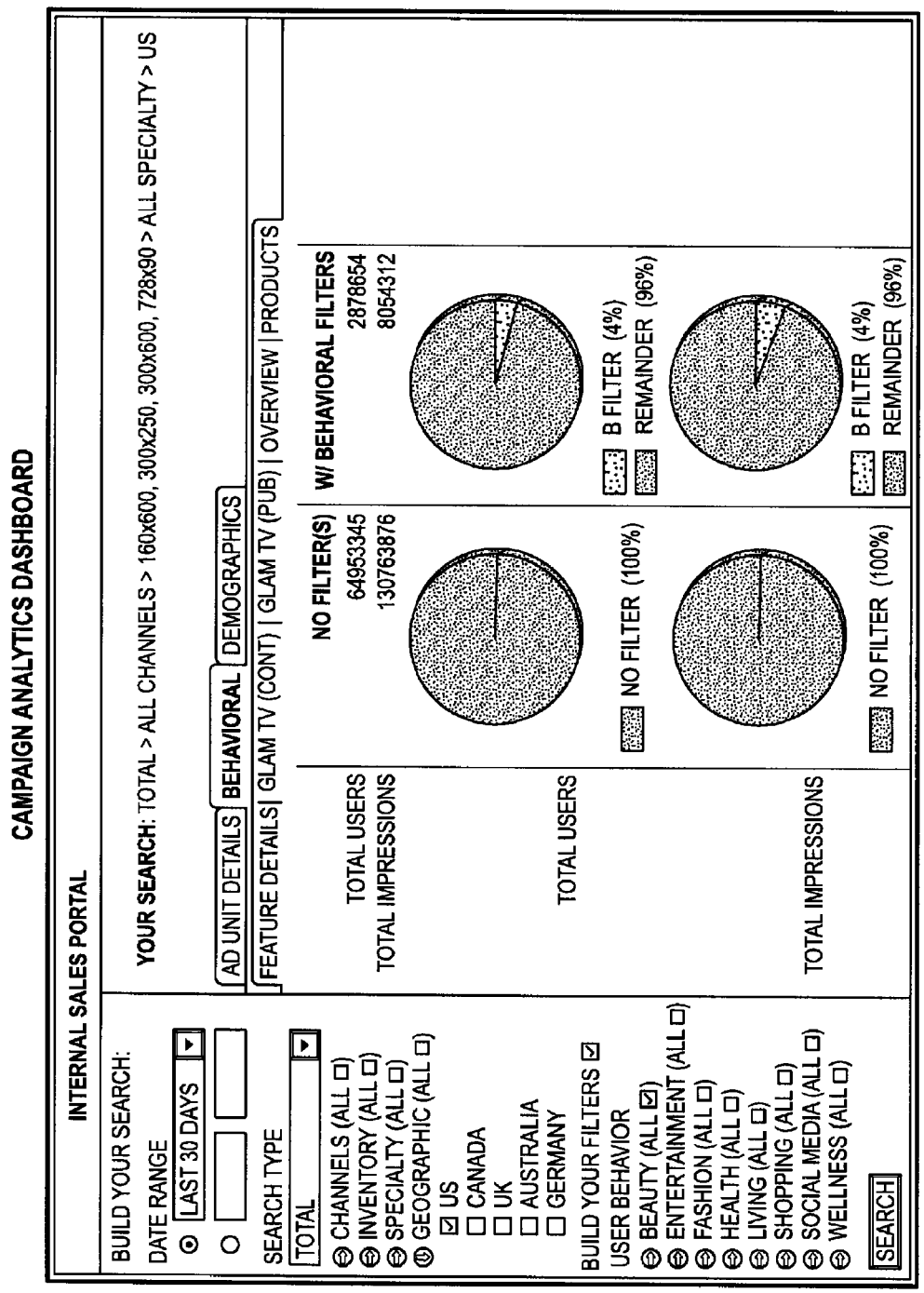
FIG. 8 is an example of a web-based campaign planning tool for delivering on-line brand advertising in accordance with the concepts of the present invention.

Based on the historical log data collected about the past brand ads along the metrics of the disclosed ad platform's five dimensions, forecasts of inventory for ad impressions across the network are provided by means of a Web-based campaign planning tool. An example of this tool is presented in FIG. 8. Using this tool, a sales planner can select various targeting criteria for a brand ad campaign and obtain a visual report of the available impressions inventory that meet those criteria.

It should be understood that the systems and methods described herein can use any appropriate technology, such as HTML, JavaScript, SQL server, etc., as known in the art for serving and displaying the material discussed herein. The information can be delivered by any appropriate means, such as over an Internet connection, over a wireless connection, offline from a computer readable medium, or via any other appropriate signal or information delivery mechanism. The material can be viewed on any appropriate device, such as a computer, television, mobile phone, handheld gaming device, or other device capable of displaying the information. The code and images for the site, as well as any other content, can be contained on a central server, on many different servers, on a number of networked computers, on a single computer, on a computer readable medium, or on any other appropriate device known or used for containing such information. The computer readable medium can be any appropriate medium, such as may include flash memory, hard disks, optical discs, CD-ROMs, DVDs, memory sticks, memory drives, memory chips, magnetic media, transmission signals, and any other appropriate medium. Portions of the sites and the tools for creating and displaying these sites can be implemented in software, hardware, or a combination thereof, using any appropriate technology known or used in the art.

It should be recognized that a number of variations of the above-identified embodiments will be obvious to one of ordinary skill in the art in view of the foregoing description. Accordingly, the invention is not to be limited by those specific embodiments of the present invention shown and described herein. Rather, the scope of the invention is to be defined by the following claims and their equivalents.

What is claimed is:

1. A method of delivering targeted on-line advertising to an end user of a computer network system, the method comprising:

defining, through a network server of the computer network system, an ad targeting criteria associated with an advertising campaign, the ad targeting criteria having a plurality of dimensions, including audience, context, time, placement and engagement, each dimension having a weighting factor (w) and a plurality of metrics associated therewith;

obtaining, by the network server, metrics data for the plurality of metrics, and storing the metrics data in a metrics database;

obtaining, by the network server, end user data based upon engagement of the end user with the computer network system, and storing the end user data in an end user database;

profiling, by the network server, advertisement content available on the computer network system to identify items of advertisement content that are compatible with the ad targeting criteria;

calculating an effectiveness measurement value for each item of compatible advertisement content based upon the end user data and the metrics data using the network server, wherein the effectiveness measurement value comprises a Prime Target Rank (PTR), the PTR being a positive real number, wherein $$PTR=w_1*A+w_2*C+w_3*T+w_4*P+w_5*E(w_1+w_2+w_3+w_4+w_5=1.0)$$

A=Audience (positive real number)
C=Context (positive real number)
T=Time (positive real number)
P=Placement (positive real number)
E=Engagement (positive real number);

selecting, by the network server, at least one item of compatible advertisement content based on the effectiveness measurement values; and delivering the selected compatible advertisement content from the network server to the end user.

2. The method of claim 1, wherein, each of the plurality of dimensions has specific values associated with the metrics in that dimension by the ad targeting criteria.

3. The method of claim 1, and further comprising:

comparing the PTR of the advertising campaign with a PTR of at least one other advertising campaign to determine the effectiveness of the advertising campaign.

4. An advertisement delivery system for delivering targeted on-line advertising to an end user of a computer network system, the advertisement delivery system comprising:

a network server in the computer network system, the network server configured to define an ad targeting criteria associated with an advertising campaign, the ad targeting criteria having a plurality of dimensions, including audience, context, time, placement and engagement, each dimension having a weighting factor (w) and a plurality of metrics associated therewith;

a metrics database storing metrics data for the plurality of metrics; and an end user database storing end user data obtained by the network server based upon engagement of the end user with the computer network system;

the network server further configured to profile advertisement content available on the computer network system to identify items of advertisement content that are compatible with the ad targeting criteria, and to calculate an effectiveness measurement value for each item of compatible advertisement based upon the end user data and the metrics data content using the network server, wherein the effectiveness measurement value comprises a Prime Target Rank (PTR), the PTR being a positive real number, wherein:

$$PTR=w_1*A+w_2*C+w_3*T+w_4*P+w_5*E(w_1+w_2+w_3+w_4+w_5=1.0)$$

A=Audience (positive real number)
C=Context (positive real number)
T=Time (positive real number)
P=Placement (positive real number)
E=Engagement (positive real number);

the network server further configured to select at least one item of compatible advertisement content based on the effectiveness measurement values, and to deliver the selected compatible advertisement content from the network server to the end user.

5. The advertisement delivery system of claim 4, wherein the network server compares the PTR of the advertising campaign with a PTR of at least one other advertising campaign to determine the effectiveness of the advertising campaign.

6. The advertisement delivery system of claim 4, wherein the network server selects at least one item of compatible advertisement content based upon yield criteria.

* * * * *